Jan. 11, 1938.  B. H. FLYNN  2,105,034
LEVEL INDICATING DEVICE
Filed May 11, 1937   2 Sheets-Sheet 1
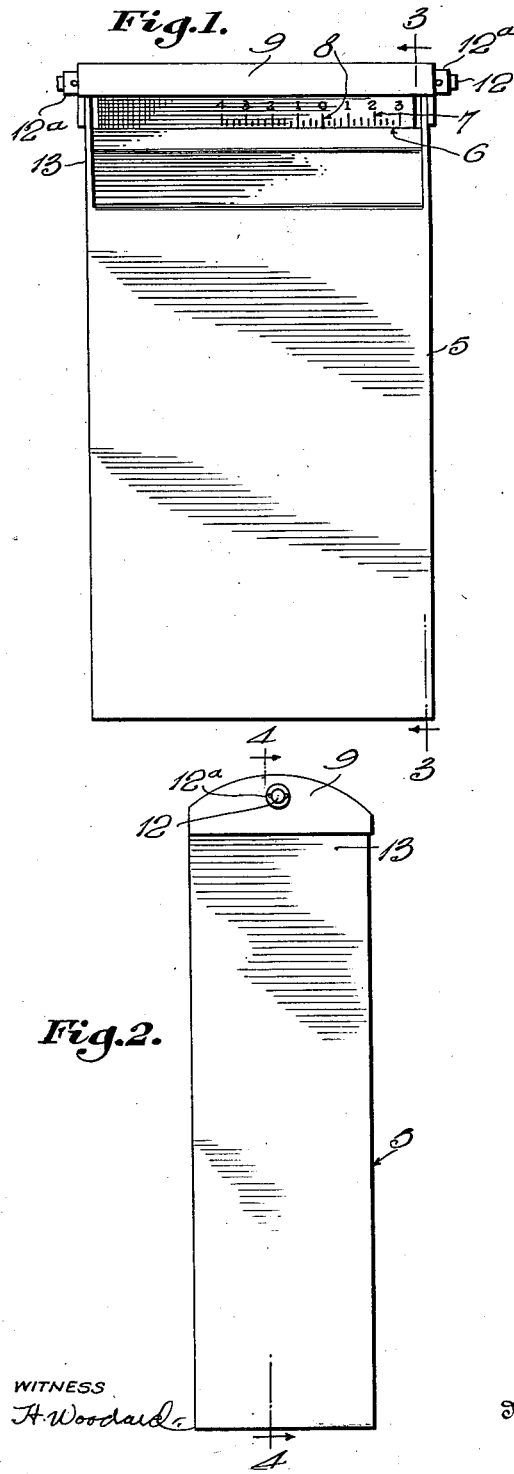
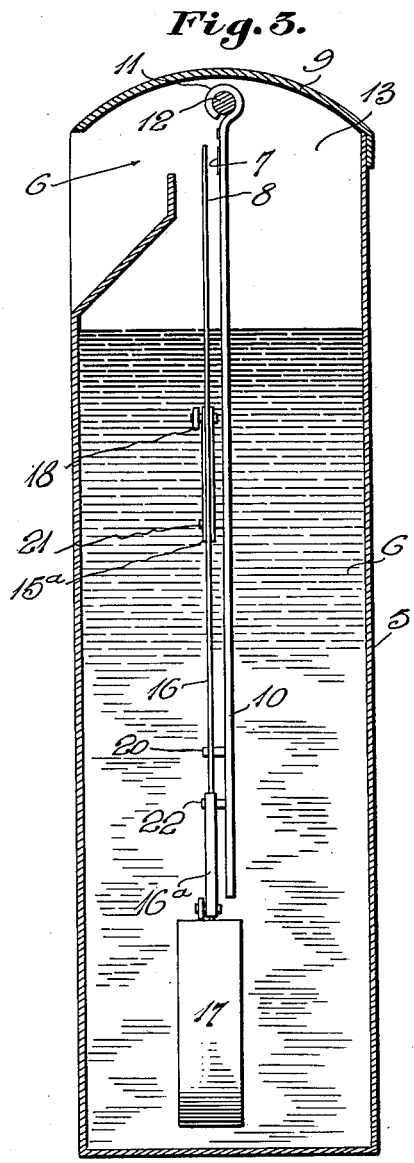
Inventor
Benjamin H. Flynn Jan. 11, 1938.  B. H. FLYNN  2,105,034
LEVEL INDICATING DEVICE
Filed May 11, 1937  2 Sheets-Sheet 2

Patented Jan. 11, 1938

2,105,034

UNITED STATES PATENT OFFICE 2,105,034

LEVEL INDICATING DEVICE

Benjamin H. Flynn, Alexandria, La.

Application May 11, 1937, Serial No. 142,036

3 Claims. (Cl. 33—215)

The invention relates to a new and improved indicating device designed primarily for use upon mobile machines which must be kept level transversely, an example of such machines being the subgrading or road maintenance machine disclosed in my U. S. Patent 2,027,685. With such a machine, it is important that accurate cutting be produced, as even very slight deviations from desired shape or grade will not be tolerated by various city and highway engineers. One object of the invention, therefore, is to provide a device which will show at a glance when the machine is not transversely level, the indicating scale of said device preferably being calibrated in inches to show how many inches high or low one or the other side of the machine may be, if not entirely level.

Another object of the invention is to provide an indicating device which will not be seriously affected by the vibration of the machine on which it is mounted.

Still another object is to provide a novel construction in which only a very limited movement of an operating weight will cause a relatively great movement of an indicating pointer.

With the foregoing in view, the invention resides in the novel subject matter hereinafter described and claimed, description being accomplished by reference to the accompanying drawings.

Fig. 1 is a front elevation.

Fig. 2 is an edge view.

Fig. 3 is a vertical section substantially on line 3—3 of Fig. 1.

Figure 4:
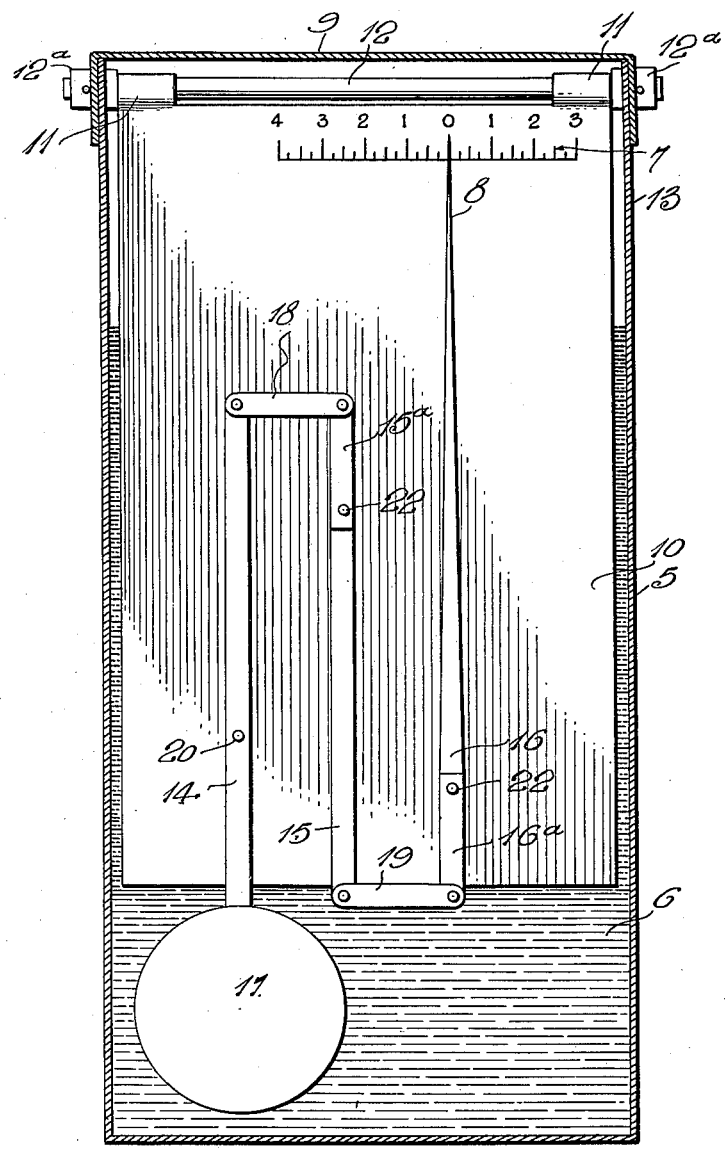
Fig. 4 is a vertical sectional view substantially on line 4—4 of Fig. 2.

A preferred construction has been illustrated and will be specifically described, with the understanding, however, that within the scope of the invention as claimed, variations may be made.

In all cases requiring that the indicator be subjected to rough usage and to vibration, all moving parts are preferably housed in a vertically elongated casing 5 which may contain oil 6 or other suitable liquid to prevent the vibration from continually moving said parts, and to also lubricate them. This casing 5 is provided in the upper portion of its front wall with a view opening 6, through which the indicating scale 7 (preferably calibrated in inches) and the coacting pointer 8, are visible. The upper end of the casing 5 is preferably closed by a removable cap 9 which may be secured in place in any suitable way.

A vertical plate 10 is pivotally suspended in the casing 5 to swing broadside toward the front and rear walls of said casing, the scale 7 being carried by the upper front portion of said plate. While this plate may be suspended in any preferred way, I have shown its upper end provided with knuckles 11 through which a bolt or rod 12 passes, the ends of said bolt or rod passing through the vertical edge walls 13 of the casing 5 and being provided with pinned-on collars or the like 12ª.

I pivotally mount a series of vertical levers on the plate 10 and dispose them at the front side of said plate, there being three levers 14, 15 and 16 in the present disclosure. These levers are operatively connected with each other and the lower end of lever 14 is provided with an operating weight 17 for the pointer 8, said pointer being formed by the upper end of the lever 16.

In the present showing, a link 18 connects and is pivoted to the upper ends of the levers 14 and 15, and another link 19 connects and is pivoted to the lower ends of the levers 15 and 16. The fulcrum or pivot point 20 of lever 14 may be located about centrally between the upper end of this lever and the lower end of the weight 17. The fulcrum or pivot point 21 of lever 15, however, is preferably nearer to the upper end of said lever than to the lower end thereof, and the pivot or fulcrum 22 of lever 16 is nearer to the lower end of this lever than to the upper end thereof. It is thus insured that with very little movement of the weight 17, relatively great movement of the pointer 8 shall be attained, permitting the use of an unusually long scale which may have its various graduations spaced fully an inch apart if desired. This makes it much easier for the operator of the machine to read the indicator at a glance.

Whenever the device is to be used under such conditions that the casing 5 is not required, it will be obvious that some other adequate support could be substituted for this casing. However, for rough usage, the device preferably includes the casing 5, and when liquid 6 is employed in this casing, it prevents numerous machine movements and vibrations from continually causing the plate 10 to swing upon its pivotal suspending means, or causing the indicating parts to continually move under the influence of the weight 17. The liquid dampens or checks any movements of the plate 10 and weight 17 so that negligible machine movements will not affect the pointer 8 but when any serious protracted inclination occurs, the plate 10 and weight 17 are given ample time to swing against the resistance of the liquid, said weight then actuating the pointer 8 to show the deviation from the horizontal. The plate 10, of course, remains vertical whether the machine be running truly horizontal, up-grade or down-grade, and thus insures free working of the indicating parts whenever the machine tilts laterally in one direction or the other.

Preferably the short upper arm 15ᵃ of lever 15 is thickened to so increase its weight as to balance the weight of the long lower arm of said lever, and the short lower arm 16ᵃ of lever 16 is similarly thickened to so increase its weight as to balance the long upper arm of this lever. Thus, movement of the levers 15 and 16 from the vertical will not cause either end thereof to have a tendency to swing downwardly by gravity, and I am enabled to use a lighter weight 17, than if said weight were required to operate unbalanced levers.

As excellent results are attainable from the general construction shown and described, it is preferably followed, but attention is again invited to the possibility of making variations within the scope of the invention as claimed.

I claim:—

1. A leveling device comprising a casing, a liquid partially filling said casing, a support pivotally hung in said casing and extending partially above and partially below the liquid level therein, a scale on said support above said liquid level, a pointer pivotally mounted on said support and extending partially below and partially above said liquid level, the upper end of said pointer being cooperable with said scale, and weighted operating means for said pointer mounted on said support, said casing having a view opening above said liquid level through which said scale and the upper end of said pointer are visible.

2. A leveling device comprising a casing, a vertical plate in said casing, single-axis means pivotally suspending said plate directly from the upper portion of the casing to swing broadside only, a vertical pointer pivotally mounted on said plate for movement in a plane parallel therewith, said pointer being disposed at one side of said plate, a weight pivotally hung from said plate and disposed at said side thereof, means operatively connecting said weight with said pointer, a scale on the upper end of said plate cooperable with said pointer, said casing having a view opening opposite said scale, and a liquid filling said casing to a level below said view opening and scale.

3. A leveling device comprising a vertically elongated casing having a view opening in the upper portion of its front wall, a fixed rod extending horizontally across the upper portion of said casing in parallel relation with said front wall and above said view opening, a vertical plate in said casing in parallel relation with said front wall, said plate having bearings at its upper end surrounding said rod to pivotally hang said plate for broadside movement only, a vertical pointer pivotally mounted on the front side of said plate, a scale on the upper end of said plate cooperable with said pointer and visible through said view opening, a weight pivotally hung on said plate, and connecting means between said weight and said pointer.

BENJAMIN H. FLYNN.